(12) United States Patent
Yonekura

(10) Patent No.: US 6,888,283 B2
(45) Date of Patent: May 3, 2005

(54) INTERIOR PERMANENT MAGNET SYNCHRONOUS MOTOR

(75) Inventor: Kouichiro Yonekura, Kamakura (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/717,453

(22) Filed: Nov. 21, 2003

(65) Prior Publication Data

US 2004/0130236 A1 Jul. 8, 2004

(30) Foreign Application Priority Data

Jan. 7, 2003 (JP) ........................................ 2003-001356

(51) Int. Cl.⁷ ................................................ H02K 1/00
(52) U.S. Cl. ..................... 310/216; 310/51; 310/254; 29/596
(58) Field of Search .......................... 310/51, 216, 254; 29/596

(56) References Cited

U.S. PATENT DOCUMENTS

| | | | | |
|---|---|---|---|---|
| 4,547,714 A | * | 10/1985 | Muller | 318/254 |
| 4,998,032 A | * | 3/1991 | Burgbacher | 310/51 |
| 5,170,083 A | * | 12/1992 | Burgbacher | 310/51 |
| 5,260,620 A | * | 11/1993 | Morrill | 310/185 |
| 5,331,245 A | * | 7/1994 | Burgbacher et al. | 310/186 |
| 5,773,908 A | * | 6/1998 | Stephens et al. | 310/254 |

FOREIGN PATENT DOCUMENTS

| | | | | |
|---|---|---|---|---|
| EP | 622887 A1 | * | 11/1994 | .......... H02K/41/03 |
| JP | 2001-69697 A | | 3/2001 | |
| JP | 2004080944 A | * | 3/2004 | ............ H02K/1/26 |
| JP | 2004222355 A | * | 8/2004 | ............ H02K/1/18 |

* cited by examiner

Primary Examiner—Joseph Waks
(74) Attorney, Agent, or Firm—Foley & Lardner LLP

(57) ABSTRACT

A stator (10) for a motor according to this invention has a substantially cylindrical shape and is disposed coaxially with respect to a substantially cylindrical rotor (20) which has permanent magnets. The stator (10) has a stator core (1) containing teeth (3) projecting towards the rotor (20). Each tooth has a tooth body (1b) on which a coil (2) is wound and a tooth tips (1c) having a substantially arc-shaped surface. The tooth tip (1c) faces the rotor (20) through the substantially arc-shaped surface and does not have the coil (2) wound thereon. The stator core has two types of steel plates (11e, 11d) laminated in an axial direction. The centers (16, 16') of the tooth tips of the two types of steel plates (11e, 11d) in a peripheral direction are offset in a peripheral direction from the center (15) of the tooth body in a peripheral direction. The two types of steel plates (11e, 11d) have the tooth body (1b) of the same shape.

10 Claims, 8 Drawing Sheets

INTERIOR PERMANENT MAGNET SYNCHRONOUS MOTOR

FIELD OF THE INVENTION

This invention relates to a rotating electric motor comprising a rotor with permanent magnets.

BACKGROUND OF THE INVENTION

One type of electric motor has a rotor provided with permanent magnets and a stator displaying saliency. Such an electric motor produces a cogging torque. The cogging torque represents a torque fluctuation occurring when the motor is rotated without providing a drive current. The cogging torque results from an attractive force between the pole of the rotor and the teeth (poles) of the stator. When a drive current of the motor is provided, the drive current also causes torque ripple. The torque fluctuation i.e. the cogging torque or the torque ripple associated with rotation of the rotor is particularly conspicuous in a concentrated-winding IPM motor (an interior permanent magnet motor). For example, in a type of motor mounted in a vehicle, torque fluctuation can be a source of undesirable vibration for a driver.

Tokkai 2001-69697 published by the Japan Patent Office in 2001 discloses a method termed "skew" of suppressing torque fluctuation. When a cylindrical stator is formed using laminated steel plate, skew represents a method of constructing an inclined salient pole (not parallel to the axial direction) by laminating steel plates with an extremely small angular deviation with respect to a circumferential direction (or a peripheral direction). Skew takes into account the production of torque fluctuations mainly dependent on the relative position of the stator and the rotor. Since a torque waveform from one steel plate displays a phase deviation from that from another steel plate, overall torque fluctuation is reduced by superimposing torque waveforms from all laminated steel plates.

SUMMARY OF THE INVENTION

However in comparison to a stator not provided with skew, the provision of skew on a stator increases the length of wire wound around the stator teeth. As a result, both electrical resistance and copper loss increase. It is therefore an object of this invention to suppress torque fluctuation in an IPM motor without increasing the length of wire wound around the stator teeth.

In order to achieve the above object, this invention provides a motor having a substantially cylindrical stator disposed coaxially to a substantially cylindrical rotor having permanent magnets; the stator comprising: a stator core having teeth projecting towards the rotor, each tooth comprising a tooth body which is substantially parallel to a central axis of the stator and on which a coil is wound and a tooth tip having a substantially arc-shaped surface, the tooth tip facing the rotor through the substantially arc-shaped surface and not having a coil wound thereon; wherein the coil is accommodated in a slot between adjacent teeth and a magnetic field is produced by an alternating current flowing in the coil.

The stator core includes two types of steel plate laminated in an axial direction and the centers of the tooth tips of the two types of steel plate with respect to a circumferential direction are offset in the circumferential direction from the center with respect to the circumferential direction of the tooth body.

The details as well as other features and advantages of this invention are set forth in the remainder of the specification and are shown in the accompanying drawings.

BRIEF DESCRIPTION OF THE DRAWINGS

FIG. 1 shows a stator according to a first embodiment.

FIG. 3 shows a stator according to a second embodiment.

FIG. 6 shows another stator according to the third embodiment.

FIG. 7 shows a stator according to a fourth embodiment.

FIG. 8 shows a stator according to a fifth embodiment.

DESCRIPTION OF THE PREFERRED EMBODIMENTS

Figure 1A:
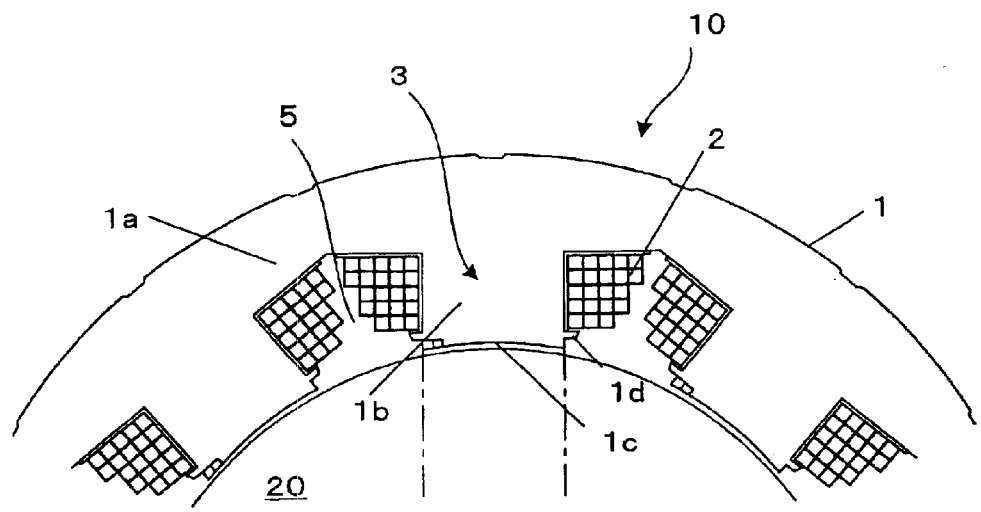
FIG. 1A is a partial end view of a stator.
Figure 4:
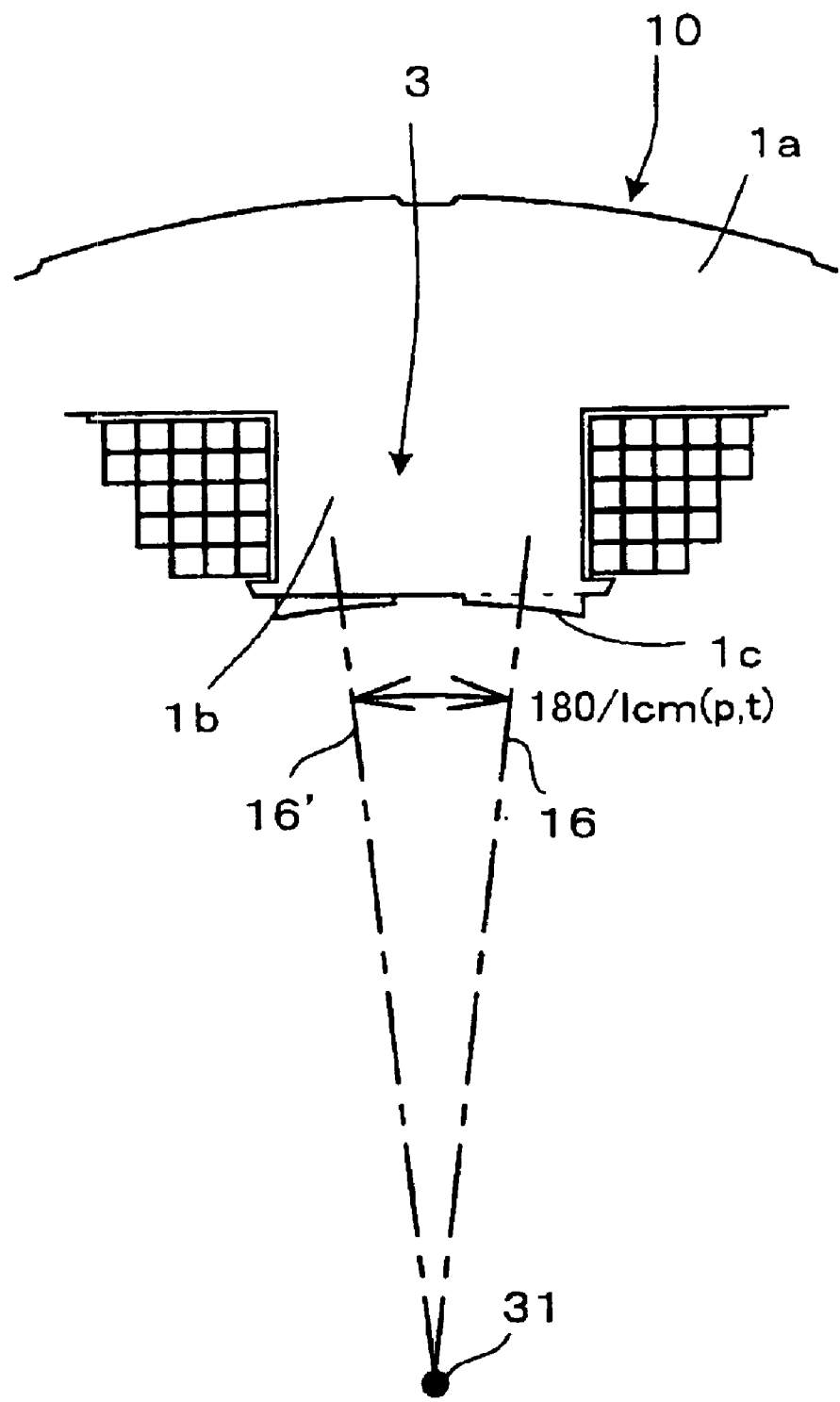
FIG. 4 is a partial end view of a stator according to a third embodiment and shows the shape of the teeth part of the steel plates constituting the stator core.

FIG. 1 shows a first embodiment of this invention. Referring to FIG. 1A of the drawings, a substantially cylindrical stator 10 comprises a stator core 1 and coils 2 wound onto the stator core 1. The stator core 1 is formed from a lamination of a plurality of thin magnetic steel plates 11 in an axial direction. For example, the steel plates 11 are silicon steel plates. The stator core 1 comprises a substantially cylindrical yoke 1a, a substantially rectangular tooth body 1b projecting from the yoke 1a towards the inner periphery of the stator (towards the rotor 20) and a tooth tip 1c facing the rotor 20 and combined with the tooth body 1b. Unlike a skewed stator core according to the prior art, the tooth body 1b is substantially parallel to the central axis 31 of the stator 10. (The central axis 31 is shown in FIG. 4.) Coils 2 are wound with concentrated windings on the tooth bodies 1b. The coils 2 are not wound on the tooth tips 1c. The concentrated windings reduce the height of the coil end and decrease copper loss. In this manner, the tooth 3 (in other words, the salient pole) projecting towards the inner periphery of the stator comprises the tooth body 1b and the tooth tip 1c. Each tooth body 1b has a shape which is substantially symmetrical with respect to a center plane 15 extending towards the central axis 31 of the stator 10. The center plane 15 is the longitudinal center (or center with respect to the circumferential direction of the stator 10) of each tooth body 1b.

A slot 5 is formed between the adjacent teeth 3 in order to accommodate the coils 2. A coil stop 1d is provided in the stator core 1 in order to prevent coil slippage and to facilitate the winding operation of the coils 2.

The rotor 20 is disposed in a coaxial orientation inside the stator 10 so as to form a substantially cylindrical air gap between the rotor 20 and the stator 10. The central axis of the substantially cylindrical stator 10 corresponds with the rotational axis of the cylindrical rotor 20. The tooth tip 1c has a substantially arc-shaped surface which is parallel to the outer peripheral face of the rotor 20. Here, the term "arc-shaped" means that the cross section perpendicular to the axial direction has an arc-shape and it may be expressed as "semi-cylindrical". Thus, the substantially arc-shaped surface of the tip 1c is opposed to the rotor 20 through the air gap. The substantially arc-shaped surface of the tooth tip 1c forms a part of the substantially cylindrical inner peripheral face of the stator 10. A permanent magnet (not shown) forming a magnetic field is provided in the rotor 20. The stator 10 produces a rotating magnetic field by applying a poly-phase alternating current to the coils 2. Consequently the rotor 20 rotates about the axis of rotation as a result of the interaction of the permanent magnets and the rotating magnetic field.

Figure 1B:
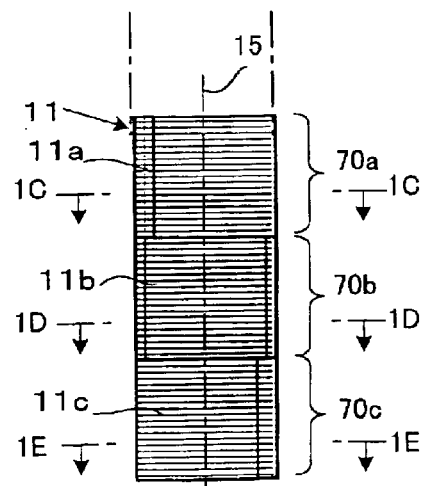
FIG. 1B is a lateral view of the teeth viewed from the rotor.

FIG. 1B is a lateral view of the tooth tip 1c seen from the rotor. Referring to FIG. 1B, three types of steel plate forms the stator core 1. The stator core 1 comprises an upper section 70a including only a first type of steel plate 11a, middle section 70b including only a second type of steel plate 11b, and a lower section 70c including only a third type of steel plate 11c. A substantially equal number of steel plates are laminated in an axial direction in each section. The axial thickness of the upper section 70a, the middle section 70b and the lower section 70c is substantially equal.

The centers of the tooth tips 1c in a longitudinal direction (in other wards, in the circumferential direction) are mutually offset. In the upper section 70a, the center plane 16 of the tooth tip of the steel plates 11a is offset to one side of the center plane 15 of the tooth body 1b. In the middle section 70b, the center plane of the tooth tip of the steel plates 11b coincides with the central face 15 of the tooth body 1b. In the lower section 70c, the center plane 16' of the tooth tip of the steel plates 11c is offset in the opposite direction to the upper section 70a. Here, the center plane 16 (16') of the tooth tip is defined as the radial plane passing through the central axis of the stator 10 and the center of the substantially arc-shaped surface of the tooth tip. The center of the tooth tip means the center of the substantially arc-shaped surface or the center plane.

Figures 1C, 1D, 1E:
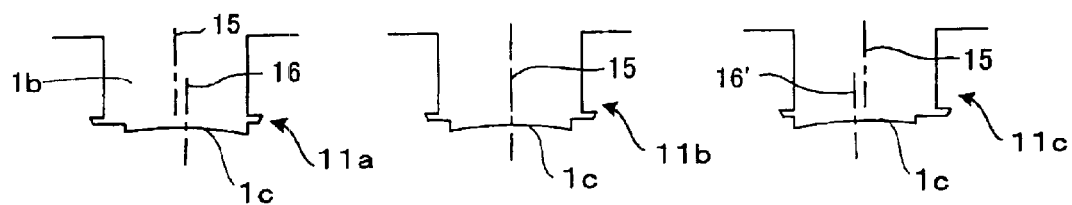
FIG. 1C is a sectional view of the teeth along the line 1C—1C and shows the shape of the teeth part of the steel plates constituting the upper section of the stator core.
FIG. 1D is a sectional view of the teeth along the line 1D—1D and shows the shape of the teeth part of the steel plates constituting the middle section of the stator core.
FIG. 1E is a sectional view of the teeth along the line 1E—1E and shows the shape of the teeth part of the steel plates constituting the lower section of the stator core.

FIGS. 1C–1E are vertical sectional views of the upper section 70a, the middle section 70b and the lower section 70c. These figures show the shape of the steel plates 11a constituting the upper section 70a, the steel plates 11b constituting the middle plate 70b and the steel plates 11c constituting the lower section 70c. In this manner, the center planes 16, 16' with respect to the longitudinal direction of the tooth tip 1c are offset in mutually opposite directions in the circumferential direction from the center of the tooth body 1b (in other words, the central flat face 15). It should be noted that three types of steel plate 11a, 11b, 11c have the tooth body 1b of the same shape.

Figure 2:
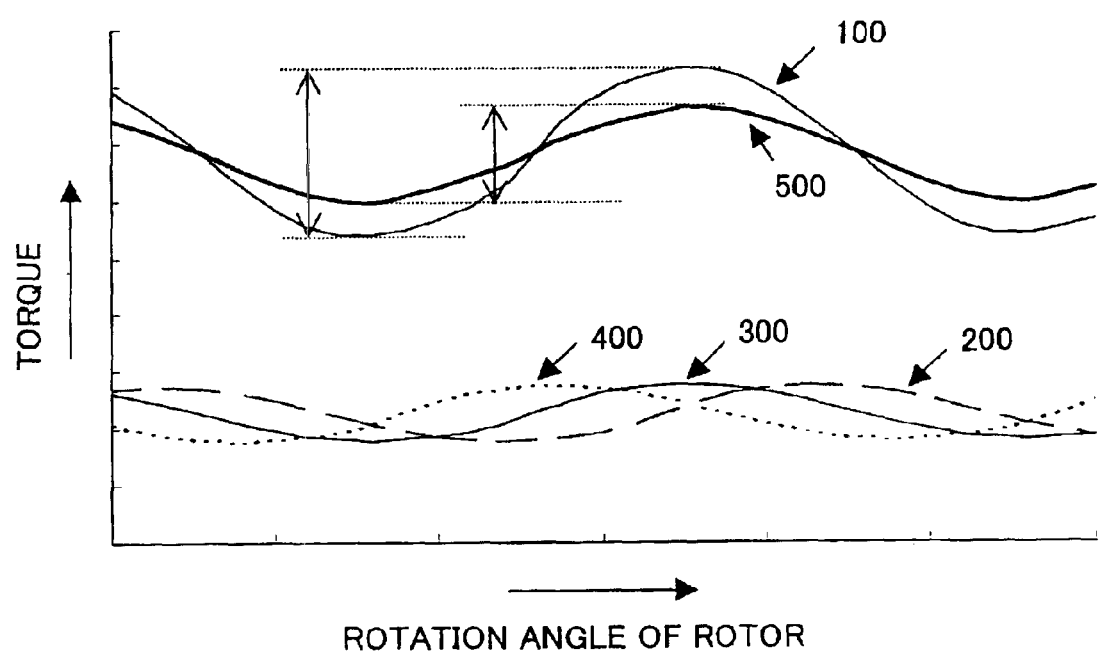
FIG. 2 shows a torque waveform of a motor according to the first embodiment.

Since the torque fluctuation of a motor comprising permanent magnets generally depends on the relative angular position of the stator and the rotor, the phase of the torque waveforms respectively produced by the upper section 70a, the middle section 70b and the lower section 70c is slightly offset from each other. FIG. 2 shows this effect. FIG. 2 shows torque production as a function of the rotational angle of the rotor (torque waveform) when a predetermined poly-phase alternating current is applied to the coils 2.

In FIG. 2, the torque waveform 100 of a conventional motor not provided with skew is three times the torque waveform 300 produced by the middle section 70b in this embodiment. On the other hand, the torque waveform 200 related to the torque produced by the upper section 70a in this embodiment displays a slightly advanced phase relative to the torque waveform 300 produced by the middle section 70b. Conversely the torque waveform 400 produced by the lower section 70c displays a slightly delayed phase relative to the torque waveform 300 produced by the middle section 70b. The composite torque waveform 500 for the overall motor in this embodiment is the sum of the torque waveforms 200, 300, 400. Although the composite torque waveform 500 displays the same average torque as the torque waveform 100 of a conventional motor without skew, the torque fluctuation of the composite torque waveform 500 is lower than that of the torque waveform 100.

The effect of this embodiment is described hereafter. Torque fluctuation can be reduced by suppressing the peak in the torque waveform. This is achieved by laminating a plurality of different types of steel plate in an axial direction. The tooth tips of the plurality of different types of steel plate display respectively different positions in a circumferential direction. However, the tooth bodies of the plurality of different types of steel plate display the same positions in a circumferential direction. Since a tooth body 1b with coil wound thereon has exactly the same shape as a conventional motor without skew, coil length and copper loss is not increased in comparison to motors without skew. This embodiment is an example of laminating three types of steel plate. However in principle, the same result is obtained when two types or three or more types of steel plate are used.

Figure 3A:
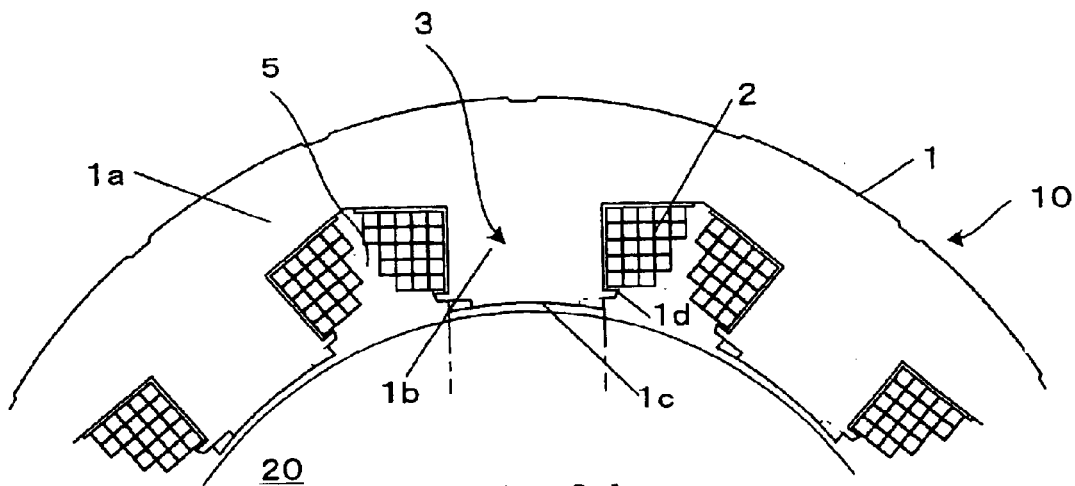
FIG. 3A is a partial end view of a stator.
Figure 3B:
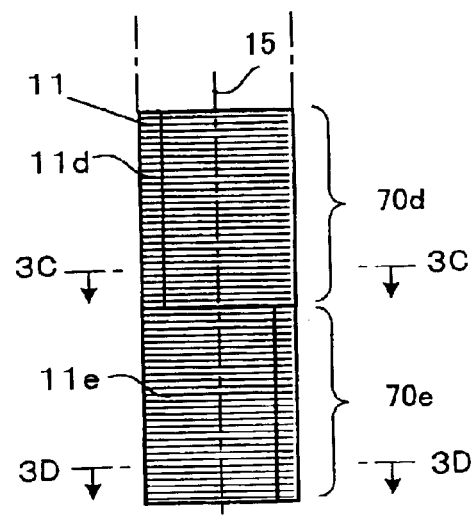
FIG. 3B is a lateral view of the teeth viewed from the rotor.
Figures 3C, 3D:
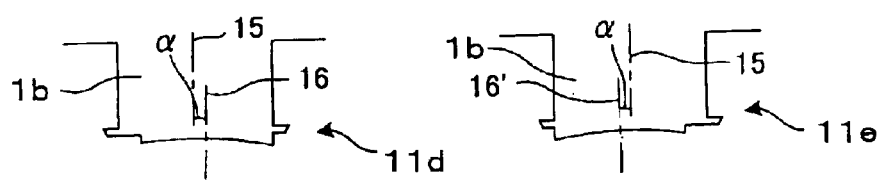
FIG. 3C is a sectional view of the teeth along the line 3C—3C and shows the shape of the teeth part of the steel plates constituting the upper section of the stator core.
FIG. 3D is a sectional view of the teeth along the line 3D—3D and shows the shape of the teeth part of the steel plates constituting the lower section of the stator core.

FIG. 3 shows a second embodiment of this invention. Referring to FIG. 3B, the stator coil 1 is formed by laminating two types of steel plates 11d, 11e having the tooth tip 1c at different positions. The two types of steel plate 11d, 11e respectively form the upper section 70d and the lower section 70e of the stator core 1. The position of the center plane 16 of the tooth tip 1c of the upper section 70e differs from the position of the center plane 16' of the tooth tip 1c of the lower section 70e. Referring to FIGS. 3C and 3D, the lower section 70e has a shape of an inverted upper section 70d. The steel plate 11d of the upper section 70d is obtained by turning a steel plate 11e of the lower section 70e back to front and thus the steel plates 11d, 11e are disposed in an inversion relationship. The tooth body 1b displays a planar symmetry with respect to the center plane 15 oriented to the central axis 31 of the stator. The tooth tips of the two types of steel plate 11d, 11e are disposed to be symmetrical with respect to the center plane 15 of the tooth body 1b when viewed along the axis of the stator 10. In other words, the two types of steel plate are disposed so that the back and front of identical steel plates are reversed. The center planes 16, 16' of the respective tooth tips of the two types of steel plates are respectively offset from the center plane 15 of the tooth body 1b by the same angle α in a circumferential direction with respect to the central axis 31 of the stator 10.

When the stator is formed using steel plates having a plurality of shapes, it is normally the case that a number of dies corresponding to those shapes. However in this embodiment, only one die is required to form the two types of the steel plate 11d, 11e. Thus it is possible to facilitate manufacture of the stator at a low cost.

FIG. 4 shows a third embodiment of this invention. The stator core in FIG. 4 uses two types of steel plate in the same structure as that used in the stator core in FIG. 3. However the angle between the center plane 16 of the tooth tip 1c of the upper section 70d of the stator core 1 and the center plane 16' of the tip 1c of the lower section 70e of the stator core 1 is specially 180/lcm(p,t)°, i.e. α=90/lcm(p,t)°. The centers of the tooth tips of the two types of steel plate are spaced 180/lcm(p,t)° from each other in the circumferential direction. Here, lcm(p,t) expresses the lowest common multiple of the number of poles p of the rotor and the number of teeth t of the stator (in other words, the number of slots). As shown in FIG. 3B, the upper section 70d and the lower section 70e respectively consist of approximately the same number of laminated plates. For example, in a motor with three pairs of poles and nine slots, the number of poles p in the rotor is six and the number of teeth t in the stator is nine. Thus the lowest common multiple lcm (p,t) is eighteen. The center of the tooth tip 1c of one type of steel plate is offset from that of another type of steel plate with respect to the circumferential direction by 10°.

Figure 5:
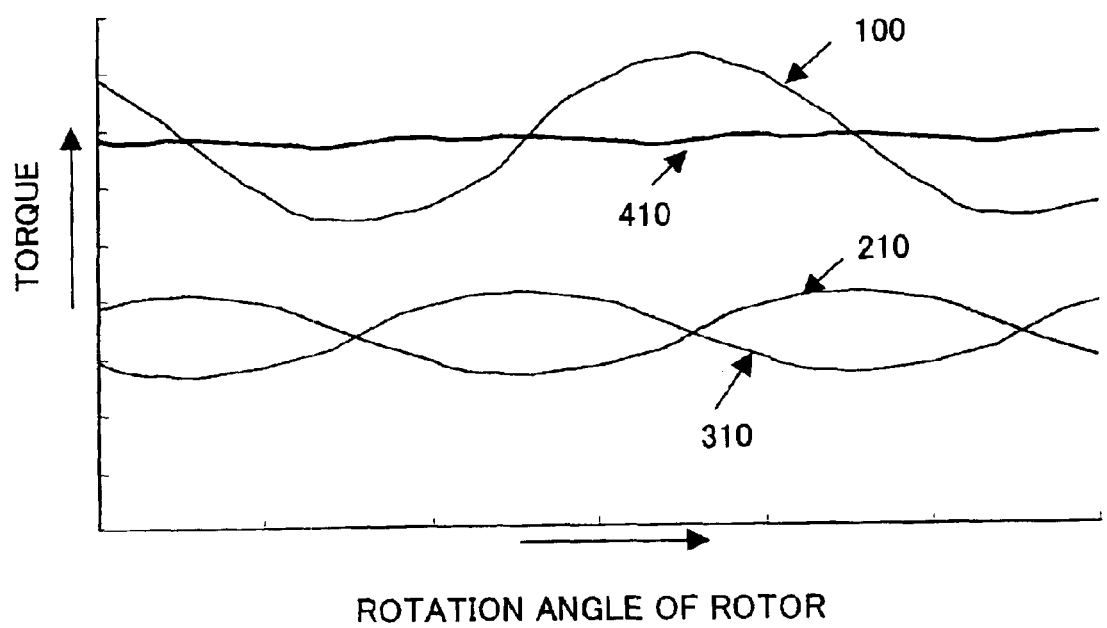
FIG. 5 shows the waveform of the torque of the motor according to the third embodiment.

FIG. 5 shows the effect of the third embodiment of this invention. It is known that torque fluctuations in a motor using permanent magnets generally occur at times of the lowest common multiple lcm(p,t) per rotation of the rotor 1. The cycle of torque fluctuations is 360/lcm(p,t)°. When two types of steel plate are used, two torque waveforms with a phase difference of a half cycle can be produced having half the size (average size) of the total torque. This is achieved by offsetting the center of the tooth tip 1c by 180/lcm(p,t)°. As shown in FIG. 5, it is possible to eliminate torque fluctuations produced by two types of steel plate. The phase of the torque waveform is offset by ½ cycle between the torque waveform 210 produced by the contribution of the upper section 70d and the torque waveform 310 produced by the contribution of the lower section 70e. In this manner, the peak of the torque waveform 210 cancels out the trough of the torque waveform 310. As a result, a considerable reduction in the torque fluctuation for total torque (the torque of the overall motor) 410 is realized in comparison to the torque waveform 100 when skew is not employed. The total torque 410 is the sum of the torque waveform 210 and the torque waveform 310.

Figure 6A:
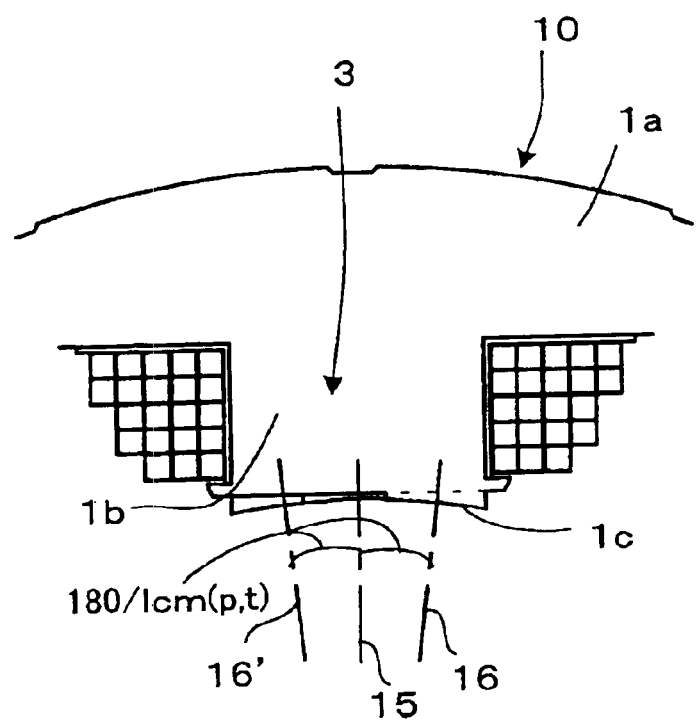
FIG. 6A is a partial end view of the stator.
Figure 6B:
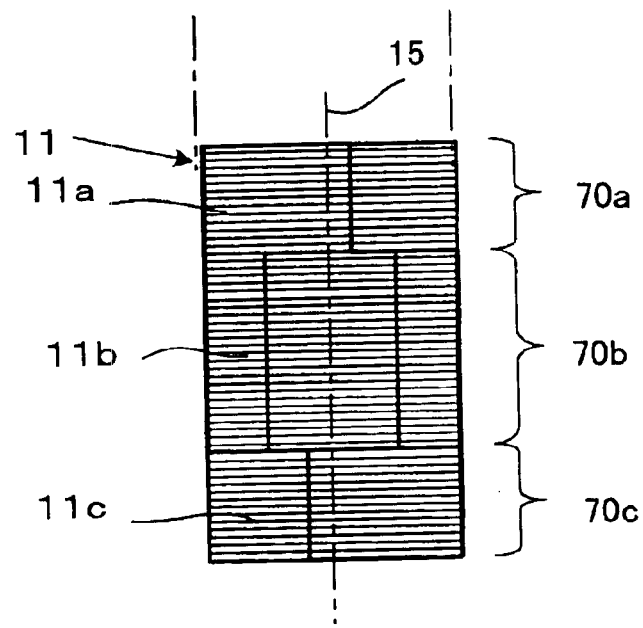
FIG. 6B is a lateral view of the teeth viewed from the rotor.

In the third embodiment, two types of steel plate 11 forms the stator 1. However it is possible to use three or more types of steel plate 11. For example, when three types of steel plate are used as shown in FIG. 6A–6B, the three types of steel plate are laminated so that the center plane 15 of the tip of the middle section 70b and the center plane 16 of the tooth tip of the upper section 70a are offset by 180/lcm(p,t)° and so that the center plane 15 of the tip of the middle section 70b and the center plane 16' of the tooth tip of the lower section 70c are offset by 180/lcm(p,t)°. The ratio of the number of laminated plates in the lower section 70c, the number of laminated plates in the middle section 70b and the number of laminated plates in the upper section 70a is 1:2:1. In other words, the number of laminated steel plates in the middle section 70b is equal to the sum of the number of laminated plates in the lower section 70c and the number of laminated plates in the upper section 70a. In this manner, two torque waveforms are generated such that the phase of the two torque waveforms differs only by ½ cycle and such that the two torque waveforms has the same average size. These two torque waveforms combine to eliminate torque fluctuations. Consequently the torque fluctuation is effectively suppressed.

Figure 7A:
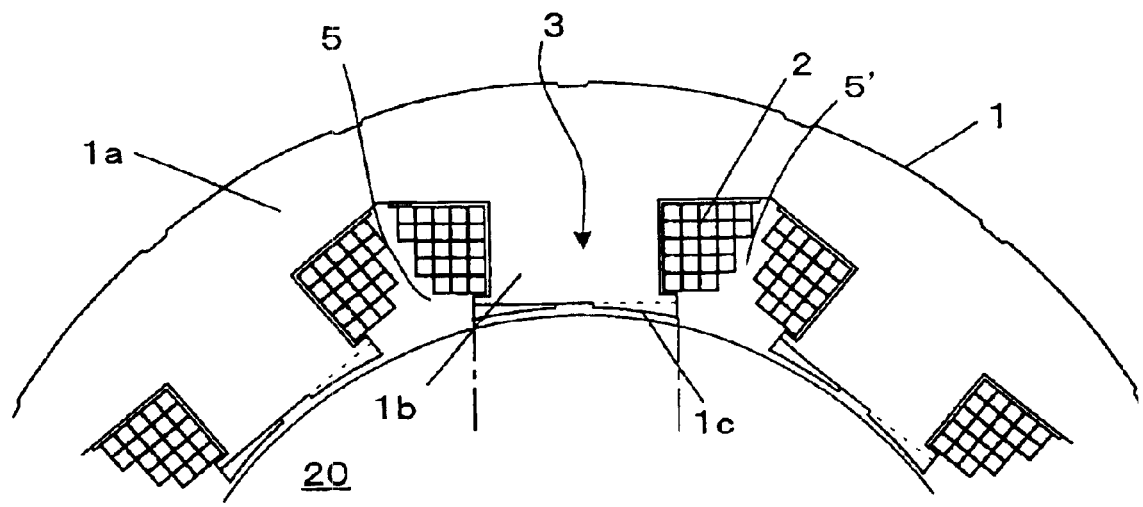
FIG. 7A is a partial end view of the stator.
Figure 7B:
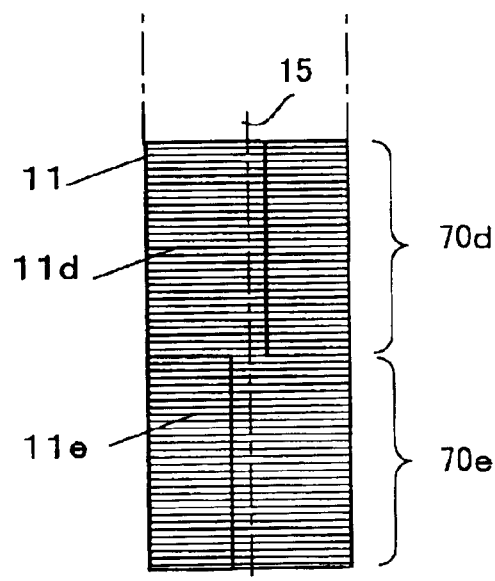
FIG. 7B is a lateral view of the teeth viewed from the rotor.

FIG. 7 shows a fourth embodiment of this invention. This figure shows a stator core formed by laminating two types of steel plate with the tooth tips at different positions (refer to FIG. 7B). The tooth tip 1c of one steel plate 11e projects towards the slot 5 from the lateral face of the tooth body 1b. The tooth tips 1c of the other steel plate 11d project towards the other slot 5' in the opposite direction to the tooth tips 1c of the steel plate 11e (refer to FIG. 7A).

The width or the shape of the tip of the teeth has a strong effect on the characteristics of the motor, and in particular, on the induction voltage induced by the coil. The harmonic content contained in the induction voltage is changed by slight variation of the shape of the tooth tip. The harmonic content in the induction voltage has an adverse effect on the control characteristics of the motor and reduces the maximum power output of the motor. Thus it is sometimes necessary to make the width of the tooth tip 1c smaller than the width of the tooth body 1b in order to suppress harmonic content.

When the width of the tooth tip 1c is smaller than the tooth body 1b, it is necessary to provide a coil stopper 1d on the tooth body in order to prevent slip of detachment of the coils when the motor is operating and to facilitate winding operations of the coils. However the coil stopper 1d produces a leakage flux between adjacent teeth and may reduce the efficiency of the motor.

According to this embodiment, the tooth tip 1c projects towards the slot from the lateral face of the tooth body. As a result, even when the width of the tooth tip 1c smaller than the width of the tooth body 1b, it is not necessary to provide another coil stopper and adverse effects on motor efficiency can be avoided.

Figure 8A:
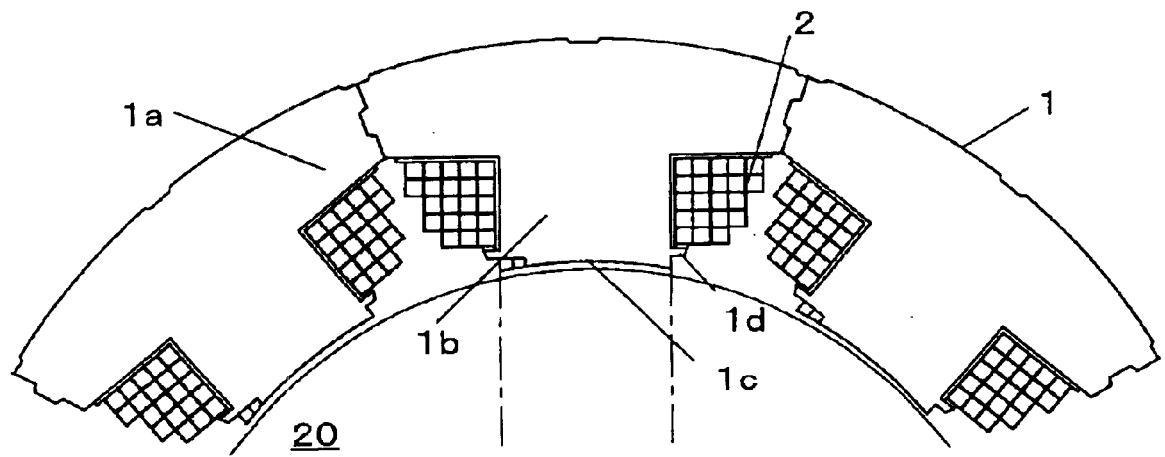
FIG. 8A is a partial end view of the stator.
Figure 8B:
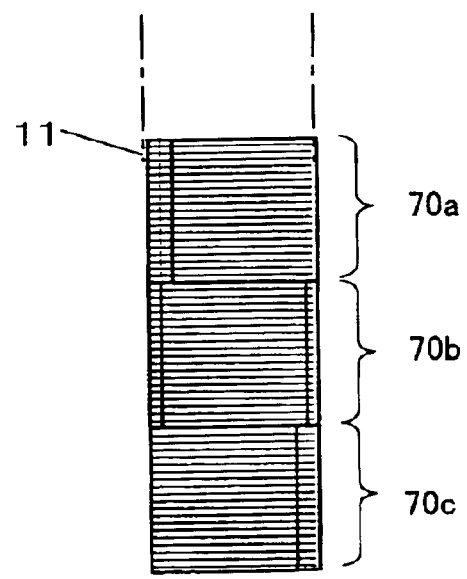
FIG. 8B is a lateral view of the teeth viewed from the rotor.

FIG. 8 shows a fifth embodiment applied to a stator comprising a divided core. The fifth embodiment has the same structure as the first embodiment (FIG. 1) except for having the divided core.

In this embodiment, the divided core is formed by laminating three types of steel plates substantially in the form of a letter "T". Only the shape of the tooth tip is different among three types of steel plates. After a coil is wound in concentrated windings on the tooth body 1b of each divided core, a cylindrical stator is formed by arranging a predetermined number of divided cores in a circumferential direction.

The prior art method of skew uses steel plates having the same shape and laminated with a slight angular offset with respect to the central axis of a stator. In a stator provided with skew using the prior art method, the contact face of adjacent divided cores comprises a distorted face. As a result, it is difficult to ensure good contact between the divided cores. However contact between the divided cores is simplified in the method according to this invention and manufacture of a stator comprising a plurality of divided cores is simplified.

The entire contents of Japanese Patent Application P2003-1356 (filed Jan. 7, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A motor having a substantially cylindrical stator disposed coaxially to a substantially cylindrical rotor having permanent magnets; the stator comprising:

a stator core having teeth projecting towards the rotor, each tooth comprising a tooth body which is substantially parallel to a central axis of the stator and on which a coil is wound and a tooth tip having a substantially arc-shaped surface, the tooth tip facing the rotor through the substantially arc-shaped surface and not having a coil wound thereon; wherein the coil is accommodated in a slot between adjacent teeth and a magnetic field is produced by an alternating current flowing in the coil;

wherein the stator core includes two types of steel plate laminated in an axial direction, the centers of the tooth tips of the two types of steel plate with respect to a circumferential direction are offset in the circumferential direction from the center with respect to the circumferential direction of the tooth body.

2. The motor as defined in claim 1, wherein the tooth body has a substantially symmetrical shape with respect to a center plane extending towards the central axis of the stator; and the tooth tips of the two types of steel plate display symmetry with respect to the center plane of the tooth body when viewed along the central axis of the stator.

3. The motor as defined in claim 2, wherein the two types of steel plate are disposed in an inversion relationship and one type of steel plate is obtained by turning another type of steel plate back to front.

4. The motor as defined in claim 1, wherein a substantially equal number of the two types of steel plates is laminated, and the centers of the tooth tips of the two types of steel plate are spaced 180/lcm(p,t)° from each other in the circumferential direction relative to the central axis of the stator; where, lcm (p,t) is the lowest common multiple of the number of teeth t of the stator and p is the number of magnetic poles of the rotor.

5. The motor as defined in claim 1, wherein the two types of steel plate comprise a plate in which the tooth tip projects towards a slot from the tooth body in a circumferential direction and a plate in which the tooth tip projects towards another slot in an opposite direction.

6. The motor as defined in claim 1, wherein the coil is wound in concentrated windings on the tooth body.

7. The motor as defined in claim 1, wherein the stator comprises a plurality of divided cores integrated into a cylindrical shape.

8. The motor as defined in claim 1, wherein the tooth body has a substantially symmetrical shape with respect to a central plane extending towards the central axial of the stator, and the centers of the tooth tips of the two types of steel plate are offset from the central plane of the tooth body by the same angle in a circumferential direction relative to the central axis of the stator.

9. The motor as defined in claim 8, wherein the stator core comprises yet another type of steel plate and the center of the tooth tip of said another type of steel plate in a circumferential direction is positioned on the central plane of the tooth body.

10. The motor as defined in claim 9, wherein the number of laminated plates of said another type of steel plate is equal to the sum of the number of laminated plates of the first two types of steel plates; and the center of the tooth tip of the respective two types of steel plate is offset from the center of the tooth tip of said another type of steel plate by 180/lcm (p,t)° in a circumferential direction relative to the central axis of the stator; where lcm (p,t) is the lowest common multiple of the number of teeth t of the stator and p is the number of magnetic poles of the rotor.

* * * * *